March 4, 1941. M. LEVINE 2,233,951
PROCESS OF PRODUCING LOW BOILING HYDROCARBONS
Original Filed April 8, 1937
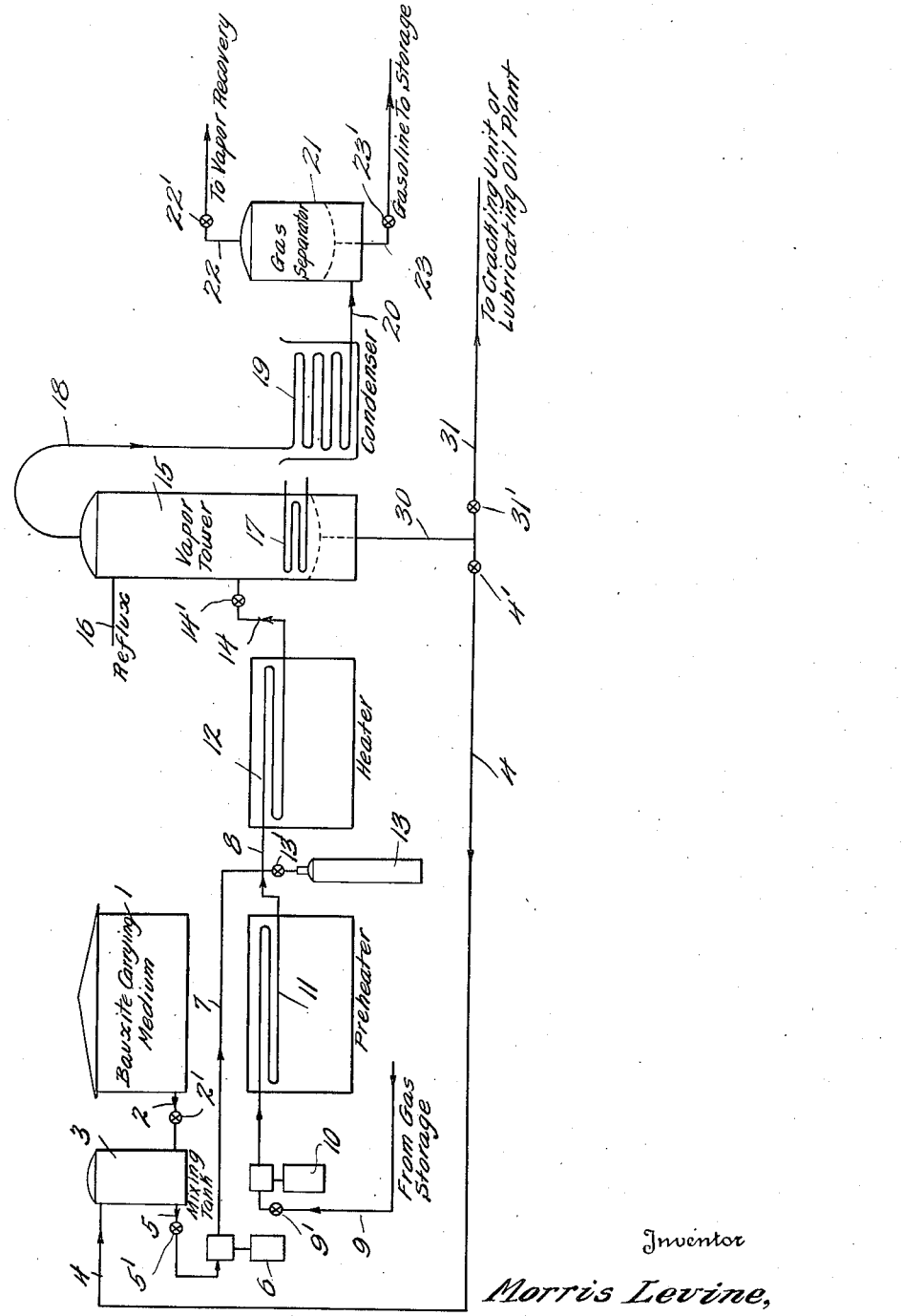
Inventor
Morris Levine,
By Raymond J. Newton
Attorney Patented Mar. 4, 1941

2,233,951

UNITED STATES PATENT OFFICE 2,233,951

PROCESS OF PRODUCING LOW BOILING HYDROCARBONS

Morris Levine, Pampa, Tex., assignor to Danciger Oil & Refineries, Inc., Tulsa, Okla.

Application April 8, 1937, Serial No. 135,811
Renewed April 16, 1940

8 Claims. (Cl. 196—10)

This invention relates to a method of producing low boiling point liquid hydrocarbons from normally gaseous hydrocarbons, more particularly to a method of producing gasoline-like products by polymerizing (or otherwise molecularly rearranging) normally gaseous hydrocarbons, such as gaseous olefins, or gases containing them.

The present method is based upon the effect of certain catalysts in effecting the polymerization of gaseous hydrocarbons and/or condensation of unsaturated hydrocarbons with aromatic or paraffinic hydrocarbons to produce therefrom volatile, low boiling point hydrocarbon oils. As will be more particularly seen, the catalytic materials employed are cheap and readily available, and the process itself is very flexible, being amenable for employment with different types of starting materials for the production of improved end products.

An object of the present invention is to provide a novel process of producing low boiling point hydrocarbons by the catalytically influenced polymerization of lighter hydrocarbons.

Another object is to provide an improved catalyst available for the polymerization and/or condensation of gaseous hydrocarbons, such as olefins.

A further object is to produce improved types of volatile liquid hydrocarbons from cracked hydrocarbon gases.

Yet another object is to provide an improved apparatus for the production of volatile liquid hydrocarbons.

With these and other equally important objects in view, the invention comprehends the concept of subjecting light hydrocarbon fractions, such as olefinic gas, at elevated temperature and at any predetermined pressure, to the action of a catalyst having the characteristics of nitrosyl chloride. In the preferred form of the process the operation is preferably carried out in the presence of a material having an accelerating or promoting effect on the reaction, such for example as bauxite, aluminum oxide and oxides of the alkaline earth metals, zinc oxide and stannic oxide.

The process is particularly adapted for the treatment of gaseous or volatile olefins for the production of liquid gasoline-like hydrocarbons.

In order to more readily explain the invention, a typical apparatus in which a preferred form of the process may be carried out is shown in the single figure of the accompanying drawing. It is to be understood, however, that the apparatus and process to be described is given merely to exemplify the underlying features of the invention and not as defining the only embodiment of the concept.

As noted above, improved volatile gasoline-like hydrocarbons may be produced by contacting olefins, either in vapor or liquid phase, and at elevated temperatures, in the presence of a catalyst having the characteristics of nitrosyl chloride. In the preferred method the materials to be polymerized and/or condensed are also contacted with a promoting agent, such as bauxite, zinc oxide, stannic oxide and other oxides, such as oxides of the alkaline earth metals, powdered aluminum, and the like.

The process may be effectuated in a unit of the type shown in Fig. 1. The unit includes a storage vessel 1 in which is stored the promoting agent, such as bauxite, preferably suspended in a carrying vehicle, such as a saturated or relatively saturated oil. This carrying medium may be, for example, gasoline, kerosene, or any other suitable hydrocarbon mixture. The material from storage vessel 1 may be passed through line 2, controlled by valve 2', to the mixing tank 3.

As shown the recycle stock, produced in a manner more fully to be explained, may be passed into the mixing tank through the line 4. The mixing tank 3 may be provided with any suitable type of agitating means so as to insure a satisfactory suspension of the solid promoting material in the liquid carrying vehicle.

The promoter stock prepared in mixing tank 3 is passed through line 5, controlled by valve 5', and is forced by the pump 6 through the line 7 to the transfer line 8. Simultaneously the gases or gaseous mixture to be polymerized and/or condensed is taken from storage and passed through the line 9, controlled by valve 9', and forced by the pump 10 through the preheating unit 11. The preheating unit, as will be understood, may be of any desired type and capacity and is merely conventionally illustrated on the drawing.

It is to be understood that the olefinic or other products to be treated according to the process may be forced through the heating cycle either in the gaseous or liquid phase, that it is to say it is to be understood that such gases, before passage to the heating unit, may be compressed to any desired degree.

The polymerizable material, preheated to the desired degree in preheater 11, is forced through the transfer line 8 to the reactor 12. The catalytic material, preferably nitrosyl chloride, is fed from the tank 13 and valve 13' to the stream of preheated material in transit through the transfer line 8 to the reaction zone. Preferably, as shown, the catalyst and the promoting material, such as the bauxite, are added to a rapid stream of preheated polymerizable material prior to admission to the reaction zone. The combined stream, that is to say, the mixture of the bauxite and its hydrocarbon vehicle, the polymerizable gases, either in liquid or in vapor phase, and the nitrosyl chloride are thus thoroughly intermixed and are heated, in the reactor 12, to the desired reaction temperature.

It will be understood that the temperature to which the potentially reactive mass is heated will vary, depending upon the type of starting material employed and the end products desired. For the production of, for example, gasoline-like hydrocarbons from olefinic gases, the mixture may be heated in the reaction zone 12 from atmospheric temperature up to 900° F., more or less. In ordinary circumstances, such a reaction mixture preferably is heated to the order of 400° F.

During the treatment in reaction zone 12 any desired pressure may be imposed on the reaction mass. During this heat treatment in the reactor 12 polymerization and/or condensation of the gaseous hydrocarbons is effected through the catalytic agency of the nitrosyl chloride or its equivalent in conjunction with the promoting material. The stream of reaction products, including the polymerized and/or condensed gases, are then passed through the transfer line 14, controlled by the valve 14', to the vapor tower 15. The valve 14' may be a pressure reduction valve and any desired pressure differential may be maintained between the vapor tower 15 and the reaction coil 12. In these circumstances, the more volatile components of the reaction mixture may be vaporized in the tower 15 by latent or sensible heat of the mass.

The reflux liquid may suitably be introduced through line 16, in order to control the temperature at the upper portion of tower 15, and consequently the characteristics of the effluent vapors. The liquid condensate from the gas separator 21 may be utilized as the refluxing medium. In lieu of refluxing, it will be understood, that a knock-back coil may be employed in the upper section of the tower. Similarly, in the event it is found necessary or desirable to operate the reaction zone 12 at a relatively low temperature, a reboiler 17 may be employed to obtain a satisfactory product in the upper portion of the tower.

Overhead vapors of the desired boiling point, in the preferred process vapors having the boiling characteristics of gasoline, pass overhead through the line 18 to the condenser 19. In the condenser 19, as will be understood, the condensible components are liquefied. The condensed product is then passed through the line 20 to the gas separator 21. The uncondensible gases are drawn off overhead through the line 22 and valve 22' and are passed to the vapor recovery system or are otherwise advantageously disposed of. For instance, the gases, after being deprived of the gasoline constituents which they still may have after leaving the gas separator, admixed if desired with methane or other light gas, may be added to the gases leaving gas storage through line 9 and subjected again to the catalytic action of the nitrosyl chloride and bauxite. The condensed fraction, i. e., the gasoline-like constituents, are withdrawn through the line 23 and valve 23' and are passed to storage.

The condensate collecting in the tower 15 may be withdrawn through the line 30, controlled if desired by a liquid level regulated valve, to be reutilized. As shown, a portion of the condensate may be returned through the line 4, controlled by valve 4', to the mixing tank to provide the suspension medium for the promoting material. The remainder of the condensate from the tower may be passed through the line 31, controlled by valve 31', and subjected to any preferred type of treatment which is indicated by the characteristics of the stock. For example, the condensate may be passed through line 31 to a vapor or liquid phase cracking unit, gases from which are returned to the present system for further treatment. Again, if the characteristics of the condensate so indicate, such condensate may be passed to a lubricating oil plant, that is to say, the material may be subjected to any improved refinery treatment for the separation of the lubricating oil, and the residue may then be subjected to cracking.

It will be understood that, if desired, several liquid fractions of different characteristics may be withdrawn from the vapor tower 15 by the interposition of trays and drawoffs at the desired levels.

It will be appreciated that this type of process is very flexible and presents many possible modifications. For example, the liquid medium which is utilized as a carrier for the bauxite may, as noted, be any desired oil fraction. It is to be understood, however, that the provision of a liquid carrying vehicle for the bauxite is not essential, that is to say, the bauxite may be carried into the reaction system without employing a liquid vehicle.

Again, it will be appreciated that the essential reactions involved may be effectuated by passing a mixture of the polymerizable or condensable gases, particularly in the liquid phase, and in admixture with nitrosyl chloride, through a tower packed with the bauxite. Yet again the gases undergoing treatment may be compressed to the liquid phase and this liquid phase itself employed as the carrying vehicle for the promoting material.

In a further refinement of the process the overhead material from the vapor tower may be fractionated and any given proportion of the lighter reaction products may be recycled directly to, and be retreated in, the system.

In another phase of the present invention, improved products may be produced by subjecting any predetermined mixtures of olefins or gases containing them, together with aromatic hydrocarbons, to the type of treatment mentioned. For this purpose aromatic or benzene hydrocarbons, particularly the lighter fractions thereof, may be combined with the stream of unsaturated hydrocarbons either prior to passage of the latter through the preheater 11, or such aromatic hydrocarbons may be admixed with the stream of preheated unsaturated hydrocarbons passing through the line 8. In these circumstances the catalytic material facilitates the condensation of the olefinic hydrocarbons and the aromatic hydrocarbons to produce improved types of hydrocarbon oils. In this modification of the invention, as will be understood, the aromatic hydrocarbon fraction which is to be processed in the system may be utilized as the carrying vehicle for the bauxite or equivalent promoter. Such aromatic hydrocarbons, as will be understood, may comprise a fraction produced by pyrogenetic conversion of paraffin and naphthene hydrocarbons at elevated temperatures.

Similarly the present process may be utilized to effect a condensation reaction between unsaturated or olefinic hydrocarbons and paraffinic hydrocarbons. In these circumstances, straight run gasoline or similar hydrocarbon oil fractions may be utilized as the carrying vehicle for the bauxite.

Conditions may be so chosen that normally gaseous paraffins, such as propane, may be caused to undergo a condensation reaction with the gaseous olefins associated with them.

Likewise, as will be appreciated, the process is available for the high temperature cracking of paraffinic or saturated hydrocarbon gases. Such a process may be conducted in the type of apparatus shown, in which the paraffinic gases are cracked at elevated temperatures of the order of 1000° F., in the reactor 12, in contact with the preferred type of catalyst and/or promoters described herein.

It will be understood that the broad concept of the invention involves the idea of accelerating or facilitating a polymerization and/or condensation reaction involving unsaturated hydrocarbons with or without other hydrocarbons, such as saturated aliphatic and aromatic hydrocarbons. Depending upon the type of charging stock utilized in the system and the type of final product desired, the polymerization and/or condensation reaction may be effected at ordinary pressure, but much more effectively at superatmospheric pressures of the order of 1000 pounds per square inch. The pressures however may be varied over any desirable wide range.

It will be understood that the type of processes herein defined present decided advantages. Due to the peculiar efficacy of the catalytic material or mixtures employed, the desired polymerization or condensation reactions may readily be effected. The catalytic materials employed, as will be appreciated, comprise cheap and readily available materials. While the use of nitrosyl chloride, as such, has been described, it is to be understood that in the operation of the process this material may be produced at the plant or may be produced in situ in any suitable phase of the process. Similarly, while preferred promoters, such as bauxite, aluminum oxide, and powdered aluminum have been described, it is to be understood that any equivalent material having a beneficial promoting function on the reaction may be employed.

While preferred modifications of the invention have been described, it is to be understood that these are given merely to explain the underlying principles of the invention and are not to be taken as the exclusive methods or means by which such principles may be commercially effectuated.

I claim:

1. A method of producing low boiling liquid hydrocarbons which comprises contacting normally gaseous olefinic hydrocarbons with nitrosyl chloride and bauxite, and condensing and collecting the condensable hydrocarbons formed.

2. A method of producing low boiling liquid hydrocarbons which comprises contacting normally gaseous olefinic hydrocarbons with nitrosyl chloride and aluminum oxide, at elevated temperatures, and condensing and collecting the condensable hydrocarbons formed.

3. A method of producing low boiling liquid hydrocarbons which comprises contacting gaseous olefinic hydrocarbons with nitrosyl chloride at elevated temperatures in the presence of an oxide promoter chosen from the group consisting of aluminum oxide, zinc oxide, stannic oxide and oxides of the alkaline earth metals.

4. A method of producing low boiling liquid hydrocarbons which comprises contacting normally gaseous olefinic hydrocarbons with nitrosyl chloride and bauxite at temperatures of the order of from 100° F. to 400° F.

5. A method of polymerizing gaseous olefinic hydrocarbons to produce low boiling liquid hydrocarbons therefrom which comprises heating the said hydrocarbons in their reaction zone in contact with nitrosyl chloride and at temperatures sufficiently high to effect polymerization of the hydrocarbons, condensing, and collecting the liquid hydrocarbons so formed.

6. A method of producing low boiling liquid hydrocarbons from normally gaseous olefinic hydrocarbons which comprises contacting the olefinic hydrocarbons at elevated temperatures with nitrosyl chloride and powdered aluminum in a heated reaction zone, passing the products of reaction to a distillation zone and there distilling the lighter fractions of the products of conversion and condensing and collecting such lighter fractions.

7. A method of producing improved motor fuels which comprises charging a stream of normally gaseous olefinic hydrocarbons to a reaction zone; heating such hydrocarbons in the reaction zone to elevated temperatures in contact with a catalytic material comprising nitrosyl chloride, maintaining the reactive mass in the reaction zone for a period of time to insure polymerization of the hydrocarbons; withdrawing the products of conversion from the reaction zone and fractionating such products to recover a light liquid hydrocarbon fraction therefrom.

8. A method of producing improved motor fuels which comprises charging normally gaseous olefinic hydrocarbons to a reaction zone; heating the hydrocarbons in such zone to elevated temperatures in contact with a catalytic material comprising nitrosyl chloride, maintaining the mass in the reaction zone for a period of time sufficient to insure the polymerization of the hydrocarbons; withdrawing the products of polymerization and subjecting such products to fractionation to produce a gasoline-like fraction and a lighter gaseous fraction, and recycling such gaseous fraction to the reaction zone for retreatment.

MORRIS LEVINE.